UNITED STATES PATENT OFFICE.

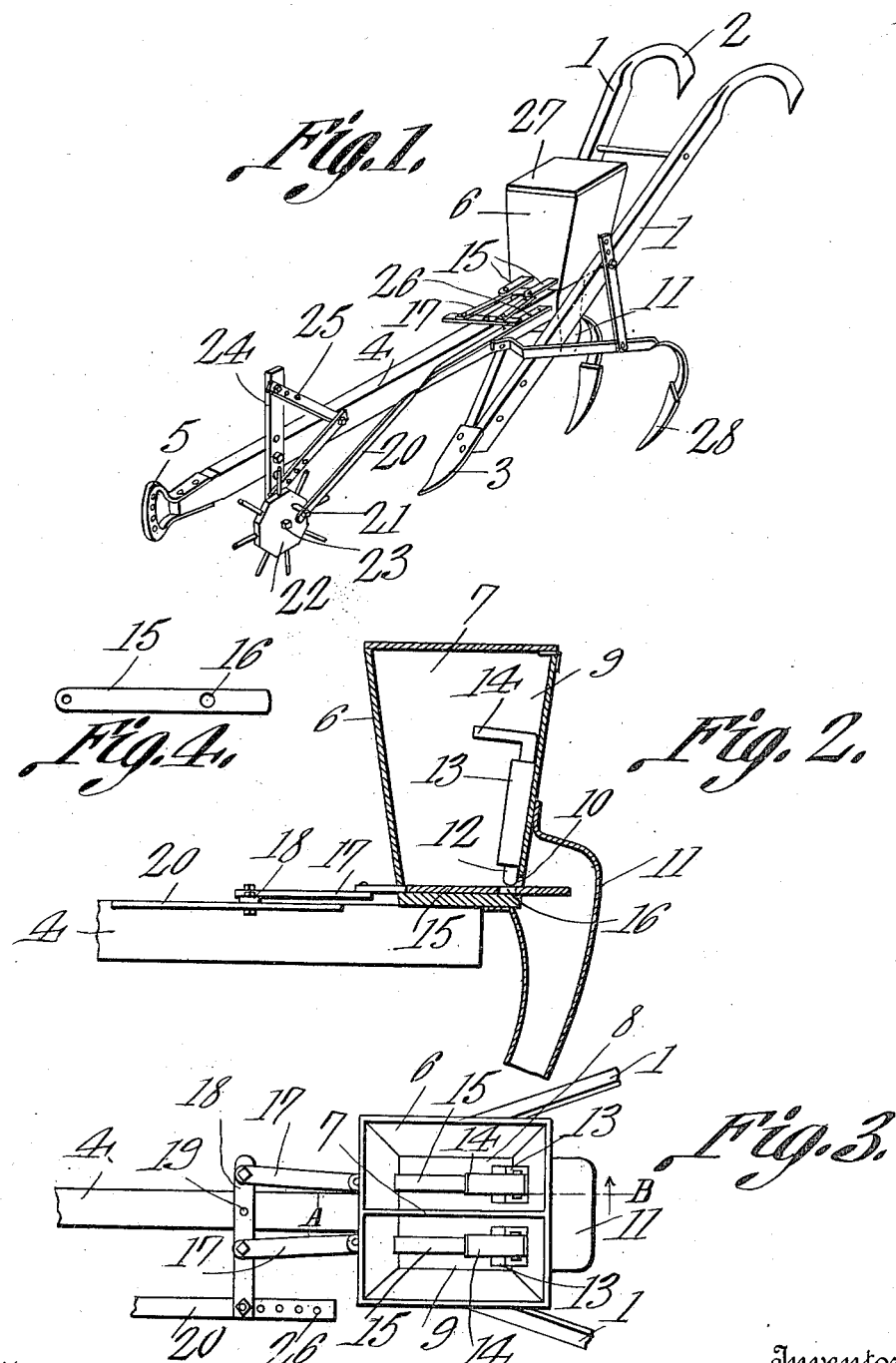

JOHN TUGGLE, OF BRUSH CREEK, TENNESSEE.

COMBINED PLANTER AND FERTILIZER-DROPPER.

1,068,547.  Specification of Letters Patent.  Patented July 29, 1913.

Application filed September 18, 1911. Serial No. 649,790.

*To all whom it may concern:*

Be it known that I, JOHN TUGGLE, a citizen of the United States, residing at Brush Creek, in the county of Smith and State of Tennessee, have invented a new and useful Combined Planter and Fertilizer-Dropper, of which the following is a specification.

This invention relates to a combined planter and fertilizer dropper and is more particularly an improvement upon the structure disclosed in Patent No. 899,144, issued to me on September 22, 1908.

The principal object of the present invention is to provide means whereby seeds and fertilizer can be dropped at the same time, improved means being employed for controlling the discharge of the seeds and fertilizer from the hopper and into the chute.

A further object is to provide improved means for operating the dropping mechanism.

Another object is to provide dropping mechanism which can be readily applied to different types of furrow openers.

With the foregoing and other objects in view which will appear as the description proceeds the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of a cultivator having the present improvements applied thereto. Fig. 2 is an enlarged central vertical section through the hopper and the mechanism connected thereto said section being taken on the line A—B Fig. 3. Fig. 3 is a plan view of the hopper and the parts adjacent thereto. Fig. 4 is a plan view of one of the slides.

Referring to the figures by characters of reference 1 designates upwardly diverging standards having handles 2 at their upper ends while their lower ends are provided with a furrow opener 3. A beam 4 is secured to and extends forwardly from the standards 1 and is provided at its front end with a clevis 5 while mounted upon the rear end portion thereof is a hopper 6 preferably divided, as by means of a longitudinal partition 7, into separate compartments 8 and 9 respectively for holding seed and fertilizer.

An outlet opening 10 is formed in the back wall of each compartment 8 and 9 at the bottom thereof and these openings communicate with the interior of a boot 11 which is fastened to the back wall of the hopper and extends downwardly therefrom so as to direct seeds and fertilizer into the furrow formed by the opener 3. Each of the outlet openings 10 is normally closed by the lower end portion of a cut-off slide 12 mounted to work within a guide 13 secured to the back wall of the hopper, this guide being located within the hopper. A handle 14 may be extended from the upper end portion of the slide and said slide is fitted loosely within the guide so as to work freely and normally to assume by gravity a position in front of the adjacent opening 10 so as to close the opening.

A plate 15 is slidably mounted upon the bottom of each compartment 8 and 9 and extends through the opening 10. These plates constitute valves and each of them has an opening 16 for conveying seeds or fertilizer to the outlet opening 10 through which the valve 15 extends. The cut-off slide 12 is of greater width than the opening 16 and said opening can, therefore, pass easily under the cut-off slide while seeds or fertilizer are being conveyed to the boot 11.

The front end portions of the slide valves 15 project through the front wall of the hopper 6 and are pivotally connected to links 17 which, in turn, are pivotally connected to a lever 18, the fulcrum 19 of the lever being located between the links. One end portion of the lever is pivotally connected to an operating rod 20 one end of which is mounted on a wrist pin 21 extending from an actiniform traction element 22. This element is mounted for rotation upon a stud 23 projecting laterally from the lower end portion of a connecting strip 24 which is bolted or otherwise secured to the beam 4 at a point in front of the furrow opener 3 and is held against movement relative to the beam by rearwardly converging braces 25 likewise bolted or otherwise fastened to the beam. Rod 20 is preferably formed with a series of apertures 26 in the rear end portion thereof, any one of which is adapted to receive the bolt or other device provided for connecting said rod to lever 18.

When the machine is moved forward the traction element 22 will be rotated by reason of its engagement with the soil and rod 20 will thus be actuated so as to oscillate lever 18. Links 17 will thus simultaneously shift the slide valves 15. During the movement of each valve in a forward direction, the opening 16 therein is brought from under the cut-off 12 and it becomes filled with seeds or fertilizer contained within the compartment in which the valve is located. During the rearward movement of the slide valve, this opening 16 passes under the cut-off 12 and into the outlet opening 10 where the contents of opening 16 gravitate into the boot 11. The cut-off 12 serves to remove excess material from the apertured portion of the valve 15 and, as it is loosely mounted within the guide 13, it will be apparent that the cut-off 12 can ride freely over the seeds or fertilizer contained within opening 16 without injuring or packing the same to an undesirable extent. The seeds or fertilizer, when discharged into boot 11, will be deposited in the furrow back of the opening 3.

It is to be understood that the traction element 22 can be placed at any desired point upon the beam 4 and by adjusting the braces 25 and the plate or strip 24, the position of the said element relative to the beam 4 can be varied.

If preferred, and as shown in the drawings, the hopper 6 may be provided with a hinged cover 27.

Covering blades 28 are connected to the rear portion of the beam 4 and are of the usual or any preferred type.

It will be understood that the parts constituting the present invention can be applied readily to any form of furrow opener and will operate efficiently to deposit both seeds and fertilizer into the soil.

The structure is very simple and durable and will not readily get out of order.

What is claimed is:—

A dropping attachment for cultivators and the like, comprising a hopper having an outlet in one wall, a slide valve mounted upon the bottom of the hopper and projecting through the outlet, said valve having an opening for the reception of material to be discharged, means for shifting the valve to move the opening through the outlet, a cut-off slide having a rounded lower end engaging the upper face of the valve and normally held in such position by gravity, said slide normally closing that portion of the outlet above the valve, and a handle at the upper end of the cut-off slide, the apertured portion of the valve being movable across the lower rounded end of the cut-off slide and said end being adapted to ride over material projecting from the opening in the valve.

In testimony that I claim the foregoing as my own, I have hereto affixed my signature in the presence of two witnesses.

JOHN TUGGLE.

Witnesses:
L. TUBB,
ALEX. VANHEASE.

Copies of this patent may be obtained for five cents each, by addressing the "Commissioner of Patents, Washington, D. C."